(12) United States Patent
Chan

(10) Patent No.: US 10,030,186 B2
(45) Date of Patent: Jul. 24, 2018

(54) HEAT TRANSFER MEDIUM

(71) Applicant: QUANTUM TECHNOLOGY GROUP LIMITED, Singapore (SG)

(72) Inventor: Ki Chan, Singapore (SG)

(73) Assignee: QUANTUM TECHNOLOGY GROUP LIMITED, Singapore (SG)

( * ) Notice: Subject to any disclaimer, the term of this patent is extended or adjusted under 35 U.S.C. 154(b) by 0 days.

(21) Appl. No.: 15/684,536

(22) Filed: Aug. 23, 2017

(65) Prior Publication Data

US 2018/0057726 A1 Mar. 1, 2018

Related U.S. Application Data

(60) Provisional application No. 62/380,764, filed on Aug. 29, 2016.

(51) Int. Cl.
*C09K 5/00* (2006.01)
*C09K 5/14* (2006.01)
*F28D 15/02* (2006.01)
*C09K 5/04* (2006.01)

(52) U.S. Cl.
CPC ............... *C09K 5/14* (2013.01); *C09K 5/04* (2013.01); *F28D 15/02* (2013.01)

(58) Field of Classification Search
None
See application file for complete search history.

(56) References Cited

U.S. PATENT DOCUMENTS

| 3,719,225 | A | 3/1973 | Mekjean et al. |
| 4,758,367 | A | 7/1988 | George |
| 6,132,823 | A | * | 10/2000 | Qu ........................... C09K 5/00 428/34.6 |
| 6,911,231 | B2 | 6/2005 | Qu |
| 6,916,430 | B1 | 7/2005 | Qu |
| 7,220,365 | B2 | 5/2007 | Qu et al. |
| 7,878,232 | B2 | 2/2011 | Arik et al. |
| 7,919,184 | B2 | * | 4/2011 | Mohapatra ............... B01J 13/04 428/402.24 |
| 2002/0182332 | A1 | 12/2002 | Qu |
| 2003/0030029 | A1 | 2/2003 | Qu |
| 2003/0217837 | A1 | 11/2003 | Luo |
| 2005/0179001 | A1 | 8/2005 | Ming |
| 2006/0005947 | A1 | 1/2006 | Arik et al. |
| 2007/0144631 | A1 | 6/2007 | Clavenna et al. |

(Continued)

FOREIGN PATENT DOCUMENTS

| EP | 1 369 918 A2 | 10/2003 |
| WO | WO 2011/088132 A1 | 7/2011 |

OTHER PUBLICATIONS

Godson, L. Et al., "Enhancement of heat transfer using nanofluids—An overview", Renewable and Sustainable Energy Reviews, Elseviers Science, New York, NY, US, vol. 14, No. 2, pp. 629-641, Feb. 1, 2010.

(Continued)

*Primary Examiner* — Necholus Ogden, Jr.
(74) *Attorney, Agent, or Firm* — Birch, Stewart, Kolasch & Birch, LLP

(57) ABSTRACT

A heat transfer medium is provided with superb thermal conductivity. The medium is comprised of selected inorganic materials to provide an environmentally-friendly aqueous suspension to provide a revolutionary kind of heat transfer fluid.

20 Claims, 10 Drawing Sheets

FIG.1A
FIG.1B
1. TEMPERATURE PROBE: FLUKE PK80-10 (CLAMP TYPE)
2. TEMPERATURE METER: FLUKE 52 SERIES
3. CARTRIDGE HEATER: 350W/220V
4. PIPE MATERIAL: STAINLESS STEEL 304
5. NO EXTRA WORKING REQUIRED ON PIPE INTERNAL WALL
6. OPTIMUM WORKING ANGLE: LARGER THAN 0.1°

(56) References Cited

U.S. PATENT DOCUMENTS

| | | |
|---|---|---|
| 2007/0158054 A1 | 7/2007 | Greaney et al. |
| 2007/0185260 A1 | 8/2007 | Lin et al. |
| 2007/0207329 A1 | 9/2007 | Chun et al. |
| 2008/0017827 A1 | 1/2008 | Ito et al. |
| 2011/0277888 A1 | 11/2011 | Chun et al. |
| 2013/0056193 A1 | 3/2013 | Thiers |
| 2013/0274151 A1* | 10/2013 | Kakadjian ............ C09K 8/68 507/204 |

OTHER PUBLICATIONS

International Search Report for International Application No. PCT/IB2017/001017, dated Feb. 14, 2018.

* cited by examiner

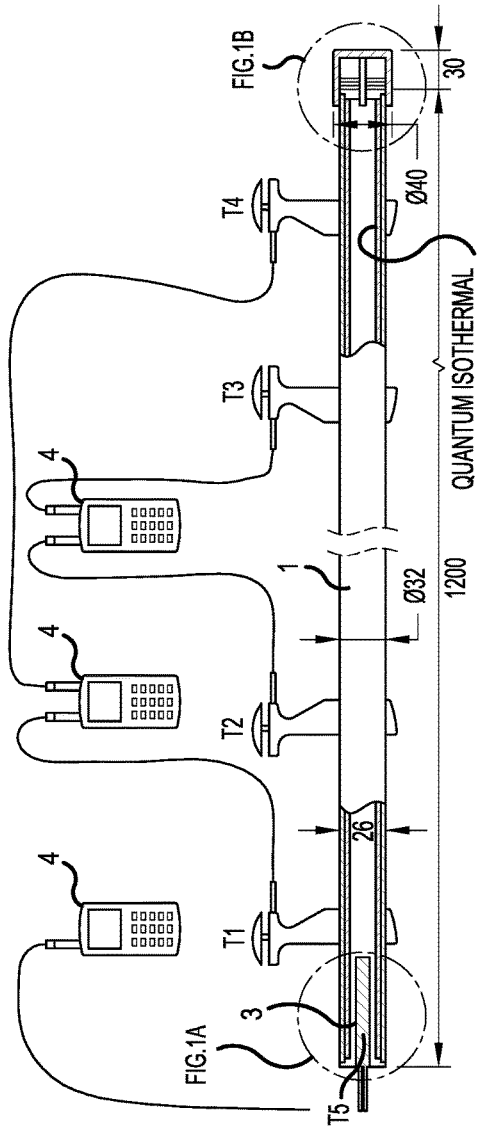
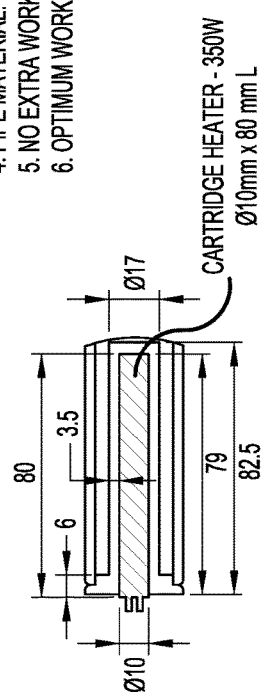
1. TEMPERATURE PROBE: FLUKE PK80-10 (CLAMP TYPE)
2. TEMPERATURE METER: FLUKE 52 SERIES
3. CARTRIDGE HEATER: 350W/220V
4. PIPE MATERIAL: STAINLESS STEEL 304
5. NO EXTRA WORKING REQUIRED ON PIPE INTERNAL WALL
6. OPTIMUM WORKING ANGLE: LARGER THAN 0.1°
FIG.1
FIG.1A
FIG.1B

HEAT TRANSFER MEDIUM

CROSS REFERENCE TO RELATED APPLICATIONS

This non-provisional application claims the benefit under 35 U.S.C. § 119(e) to U.S. Provisional Application No. 62/380,764, filed on Aug. 29, 2016, all of which is hereby expressly incorporated by reference into the present application.

BACKGROUND OF THE INVENTION

World energy investment has been greatly in demand of the development of clean energy and more efficient energy system, in order to reduce energy loss and lower $CO_2$ emissions. Since the heat transfer is the key to the energy conversion, for decades, many researchers have been taking great effort on the research and development for an enhanced heat transfer as well as a more efficient heat and mass transfer. The heat pipe invented in 1960s has been one of major breakthroughs in heat industry. This heat pipe technology brings new challenges and opportunities to current thermal technology and engineering, via heat transfer mode and heat transfer material, which is in particular brought by the nanotechnology.

In 1995, Choi et al in Argonne National Laboratory proposed a new concept—nanofluid, which is a particle suspension that consists of base liquids and nano-sized metallic/metal oxide particles, and has great potential for heat transfer enhancement because of its nanoscale effect. When the nanoparticle radius is smaller than, or similar to the heat-carrier mean free path of the host medium, the heat transfer could be nonlocal and nonlinear. Thus, the particle temperature rise is much larger than the prediction of the Fourier conduction theory. Besides, the micro convection caused by the Brownian movement of nanoparticles, congregation of nanoparticles, and orderly array of liquid molecules at the interface between the nanoparticle surface and the base fluid, contribute to the heat transfer of nanofluid. Therefore, many efforts have been on the manipulation of a nanofluid to achieve the desired heat transfer performance. However, the nanofluid as a heat transfer medium, is hard to applicable to high temperature and high pressure apparatus, and achieve the isothermal heat transfer. Previous reports show some common issues, such as: (1) large amounts of hazardous substances, which is not in compliance of international environmental standards; (2) low melting point, leading a narrow working temperature range; (3) dynamic corrosion inhibition issue, causing the ageing of thermal transfer devices and reducing the heat transfer efficiency; (4) to solve the particle congregation issue, some even tried to consider the radioactive hazardous substances; (5) the stability of thermal transfer fluid; the metal particles in the thermal fluid are easily oxidized; (6) limited heat transfer ability in the radial direction; and (7) difficulty to be applicable in high temperature and high pressure apparatus.

Prior heat transfer mediums have also included products comprising layers to provide combinations of components such as described in U.S. Pat. No. 6,132,823 to Qu. US Patent Publication 2005/0179001 describes heat-transfer mediums having an aqueous solution of one or more kinds of salts, including metallic ions. U.S. Pat. No. 7,919,184 to Mohaptra et al describes heat transfer materials comprised of hybrid nano-particles that comprise a phase change materials (PCM) (such as a wax) encapsulated in a metal layer.

| Nanoparticle | | Size (nm) | Fluid | Vol % in fluid | Performance $k_{nf}/k_f$ | Reference |
|---|---|---|---|---|---|---|
| Metal oxides | $Al_2O_3$ | 60.4 | $H_2O$ | 5.0 | 1.23 | Xie, JMSl, 2002, 21, 1469-1471 |
| | CuO | 23 | $H_2O$ | 4.5-9.7 | 1.17-1.34 | Wang, JTHT, 1999, 13, 474-480 |
| | $Fe_3O_4$ | 6.7 | $H_2O$ | 6.3 | 3 | Philip, AIP, 2007, 91, 213108 |
| | ZnO | 29 & 77 | $EG/H_2O$ (60/40) | 7 | 1.485 (@ 363K) | Vajjah, UHMT, 2009, 52, 4675 |
| | $CeO_2$ | 74 | $H_2O$ | 4 | 1.19 | Beck, JAP, 107, 066101 |
| | $ZrO_2$ | | $H_2O$ | 1.32 | 1.02-1.03 | Rea, UHMT, 2009, 52, 2042 |
| Other oxides and Nitride/carbide ceramics | AlN (with $Al_2O_3$) | | transformer oil | 0.5 | 1.08 | Choi,CurrAppl Phys 2008;8:710 |
| | SiC | 170 | $H_2O$ | 7 | 1.28 | Singh, J Appl Phys 2009;105:064306 |
| | | 90 | $EG/H_2O$ (50/50) | 4 | 1.16 | Timofeeva, JAP, 2011;109:014914 |
| | $SiO_2$ | | $H_2O$? | 31 | 1.18 | Shalkevich, J. Phys. Chem. C, 2010, 114, 9568 |
| | | 15 | | 23.3 | 1.144 (@ pH = 10.1) | Wu, Phys Rev E 2010;81:011406 |
| Semiconductors | $TiO_2$ | 10 × 40(rod)/ 15 (sph) | $H_2O$ | up to 5 | 1.33/1.30 | Murshed, Int J ThermSci 2005;44:367 |
| | | 25 | $H_2O$ | 1 | 1.14 | Yoo, ThermochimActa 2007;455:66 |
| | $SnO_2$ | 1 | $H_2O$ | 0.024 (wt %) | 1.087 (pH = 8) | Habibzadeh, ChemEng J 2010;156:471 |
| Metals | Al | 20 | $H_2O$ | 1-5 | 1.035-1.23 | Xuan, UHFF, 200, 21, 58 |
| | Ag | 8-15 | $H_2O$ | 0.10-0.39 | 1.03-1.11 | Kang, Exp. Heat Transfer. 2006, 19, 181 |
| | Au | 40 | $H_2O$ | 0.11 | 1.014 | Shalkevich, Langmuir, 2010, 26, 663 |
| | Cu | 10-20 | $H_2O$ | 0.00013 | 1.03 | Patel, Appl Phys Lett 2003;83:2931 |
| | | 50-100 | $H_2O$ | 0.10 | 1.24 | Liu, UHMT,2006, 99, 084308 |
| | Fe | 20 | $H_2O$ | 1.0-3.0 | 1.12-1.29 | Xuan, UHFF, 2000, 21, 58 |
| | | 10 | EG | 0.20-0.55 | 1.13-1.18 | Hong, JAP, 2005, 97, 064311 |
| CNTs | M-CNTs | 130 (Φ), length > 10000 | $H_2O$ | 0.60 | 1.34 | Assael, IntJ Thermophys 2005;26:647 |

-continued

| Nanoparticle | | Size (nm) | Fluid | Vol % in fluid | Performance $k_n/k_f$ | Reference |
|---|---|---|---|---|---|---|
| | | 20-50 (Φ) | EG | 1.00 | 1.124 | Liu, IntCommu Heat Mass Transfer 2005;32:1202 |
| | S-CNTs | 0.8-1.6 | H$_2$O | 0.3 | 1.16 (@ 333K) | Harish, Materials Express, 2012, 2, 213 |
| Graphene and graphene oxide nanosheets | GN | | EG | 5 | 1.86 | Yu, Phys Lett A 2011;375:1323 |
| | | | H$_2$O | 0.056 | 1.14 (25° C.) 1.64 (50° C.) | Baby, J Appl Phys 2010;108:124308 |
| | GON | | EG | 5 | 1.61 | Yu, Phys Lett A 2011;375:1323 |

Prior heat transfer mediums also often contain environmentally hazardous materials, such as chromium or compounds containing chromium.

Heat pipes are widely used to provide heat transfer to effect cooling in many applications, ranging from consumer electronics to electric power generating plants. Such heat pipes typically contain a heat transfer fluid or medium. Examples of such heat transfer fluids/mediums include water, alcohols, refrigerants (such as Freon), ammonia, and mixtures thereof. But such materials typically do not provide heat transfer effectiveness over a broad range of operating temperatures. In addition, some heat transfer mediums are corrosive to the heat pipes.

The present invention provides heat transfer mediums that provide superior heat transfer characteristics, while also avoiding the drawbacks of prior mediums.

BRIEF SUMMARY OF THE INVENTION

The present invention relates a new heat transfer material which is capable of various heat transfer modes. The invention further relates to use of the heat transfer medium, heat transfer devices including the medium, and methods for making the heat transfer medium and devices containing the medium.

The present invention is based upon several technological breakthroughs including dynamic corrosion inhibition, wide working temperature range, non-hazardous, and solid-liquid separation technology for medium synthesis etc., to thereby provide a new heat transfer medium. This new medium is capable of use with devices with any kind of material and shaped cavity, and provides isothermal heat transfer axially and radially, as well as cooling with a negative temperature gradient.

BRIEF DESCRIPTION OF THE DRAWINGS

FIG. 1 is a schematic representation of Quantum Tube according to the present invention, showing the tube prepared for testing of the heat transfer medium.

FIG. 1A is an expanded view of the far left end of the testing system of FIG. 1.

FIG. 1B is an expanded view of the far right end of the testing system of FIG. 1.

DETAILED DESCRIPTION OF THE INVENTION

Figure 2:
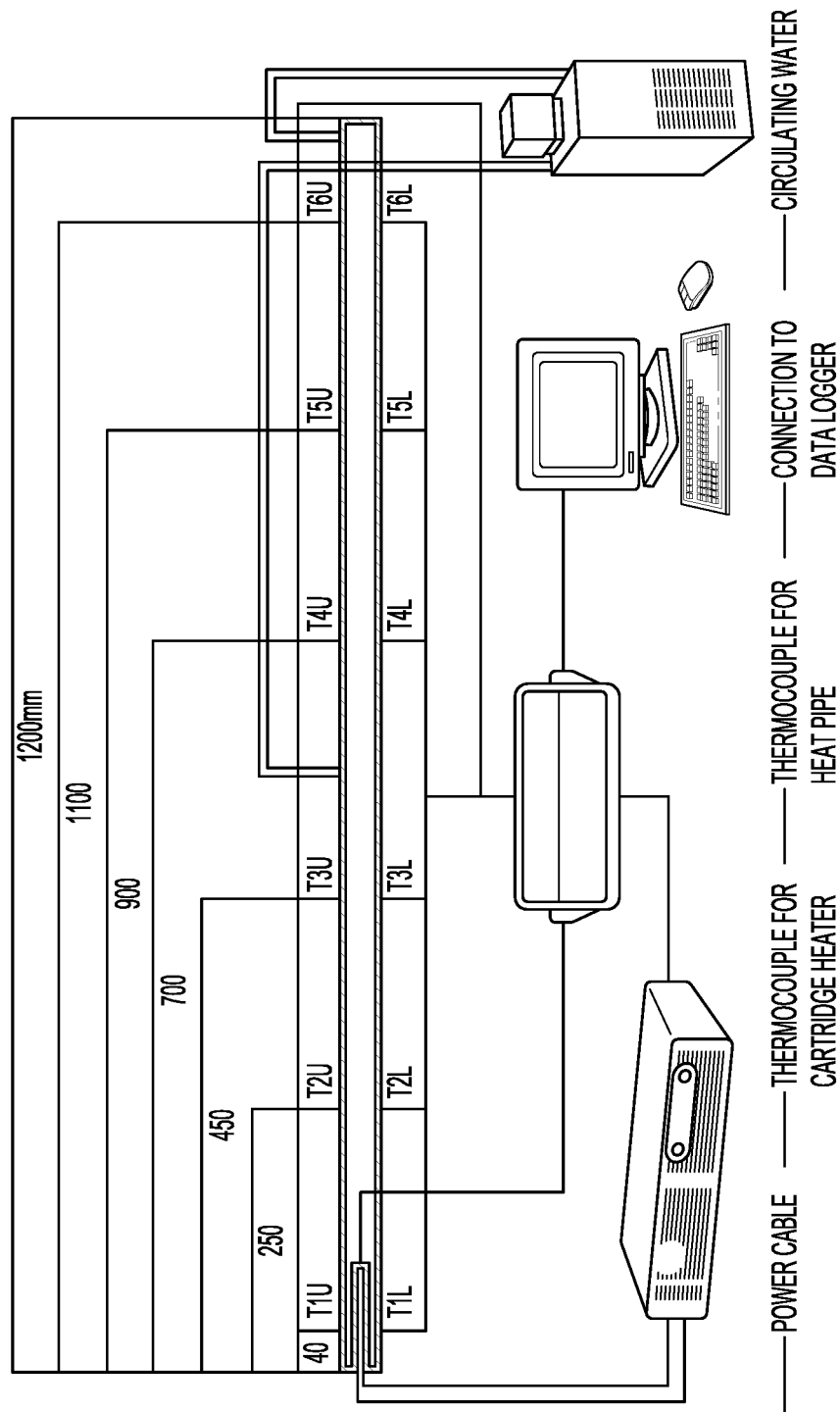
FIG. 2 is a schematic representation of a system for testing of heat transfer characteristics of the Quantum Tube.

In general, the present invention provides a heat transfer material and medium (QTG Medium) with improved and excellent heat transfer properties to enable close thermal coupling of any two points of various shaped thermal transfer devices, even over considerable lengths, without the need for active pumping of the heat transfer medium.

The unique technology:
1. Is non-hazardous, in compliance of international environmental standards.
2. Is suitable over a wide working temperature range from −25° C. to over 800° C.
3. Dynamic corrosion inhibition, and isothermal heat transfer;
4. High medium stability as the medium is synthesized by the solid-liquid separation technology;
5. Static thermal conductivity is 1.12 to 1.14, or specifically 1.13, W/m·K, which is about double of that of DI water (0.598 W/m·K).

Thus, the present invention provides at least the following advantages as compared to known mediums:
1. Minimizing the production cost of thermal transfer devices.
2. Enhancing the thermal efficiency of thermal transfer equipment.
3. Reducing energy loss and lowering $CO_2$ emissions.

The medium of the invention is a new heat transfer material with superb thermal conductivity. It is comprised of a number of inorganic chemicals/compounds, such as five to ten inorganic chemicals, with various structure and properties, all being environmentally-friendly. This multiscale power is specially designed for ensuring dynamic corrosion inhibition and for inducing strong coupling among transport processes like mass, momentum, energy, electrical and magnetic transports. Its suspension in deionized water in a volume fraction of about 1% forms a revolutionary kind of heat transfer fluid medium that differs significantly from all the others. Filling in the closed cavity of thermal transfer devices with a volume fraction of about 5 to 10%, it provides isothermal heat transfer axially and radially, and cooling with a negative temperature gradient.

This medium comprises specially-designed, multi-scale, inorganic particles with various electric and magnetic properties. It offers the dynamic corrosion inhibition in both metallic and non-metallic thermal devices, transfers heat isothermally and cooling with a negative temperature gradient.

The present invention provides a heat transfer device that comprises the heat transfer medium (QTG Medium) that enables close thermal coupling of any two points of various shaped thermal transfer devices, even over considerable lengths, without the need for active pumping of the heat transfer medium. The heat transfer device can be an elongated member having a cavity and made of a conductive material, such as stainless steel, copper, aluminum or alloys or mixtures thereof. The heat transfer medium of the invention is charged into the cavity of the elongated member. The cavity inside the thermal transfer device is in a partial vacuum state, and QTG Medium is sealed within the cavity.

QTG Medium includes a substantially homogeneous mixture of various micro/nanoparticle powders and an associated gas/liquid (e.g., water vapor, etc.). The QTG Medium consists of metallic (nano) particles, metal oxide (nano) particles, transition metal (nano) particles and non-metallic (nano) particles. Most materials, such as the (non) metallic material and transition metal oxide, exhibit a variety of physical properties, e.g., ferroelectricity, ferromagnetism, superconductivity, semiconductor, thermoelectric effect, photoelectric effect, piezoelectric effect, magnetostrictive effect, magneto-elastic effect, inductive coupling effect, superfluid and etc. And the metal-insulator transition can be obtained by tuning the temperature or pressure. QTG takes the advantage of these properties and invents QTG Medium according to the following rules:

1. Non-hazardous: QTG medium is free from hazardous substances, in compliance of international environmental standards.
2. Multiscale: Various particles with different sizes could interact.
3. Effects of electric and magnetic field, as well as the particle charges, pH-potential and conductivity on the heat transfer and dynamic corrosion inhibition.
4. Effects of kinetic energy, potential energy, thermal energy, chemical energy, etc.: High thermal conductivity, high melting & boiling point, and low dielectric constant.
5. Cross-coupling among multiphase transport processes.
6. Low production and logistics cost.

Major Factors on the Thermal Efficiency of Thermal Transfer Devices

Many reasons can affect the thermal efficiency of thermal transfer devices. These can be ascribed to the incompatibility of heat transfer medium and devices (including heat pipe), which is described in three aspects as follows: non-condensable gas, deterioration of thermal fluid properties, and corrosion of devices (including heat pipe).

(1) Non-condensable gas: chemical or electrochemical reactions between heat transfer medium and devices (including heat pipe) can generate non-condensable gas. When the device is working, this non-condensable gas is constantly pushed by the air flow and trapped at the condensation sector, forming air gap. This decreases the effective condensation area, and increase thermal resistance, resulting to a bad thermal performance or even failure of heat transfer.

(2) Deterioration of thermal fluid properties: many thermal fluids are organic, whose properties are instable, especially at high temperature. They may gradually break down, or chemically react with thermal transfer devices (including heat pipe), leading to the deterioration of fluid properties. Examples like toluene, alkanes, hydrocarbons and etc.

(3) Corrosion of devices (including heat pipe): when the device is working, the thermal fluid constantly flows inside the thermal transfer device (e.g. pipe). Factors like temperature gradient and impurity cause corrosion on device. Thus the fluid flow resistance increases, the device thermal performance decreases, and even the device failure occurs due to the corrosion perforation. This often happens in high-temperature heat pipe made of alkali metals.

QTG Medium is a new heat transfer material, and exhibits phenomenal properties, such as the following: non-volatile, high melting & boiling point, wide temperature range, strong electrostatic field, low electric conductivity, high stability, non-hazardous, environmentally friendly etc. When utilizing QTG Medium to heat (cool) a component, even a small temperature change can drive the isothermal heat transfer axially and radially and result in a homogenous temperature distribution.

Heat Transfer Materials According to the Invention

The heat transfer material and medium according to the invention comprises a mixture of inorganic compounds, physically mixed as fine particles as a substantially homogeneous mixture. The inorganic compounds for the invention can be selected from the following compounds:

| No. | Chemical Name | Chemical | CAS Number |
|---|---|---|---|
| 1 | Manganese(II, III) oxide | $Mn_3O_4$ | 1317-35-7 |
| 2 | Cobalt(II, III) oxide | $Co_3O_4$ | 1308-06-1 |
| 3 | Iron(II, III) oxide | $Fe_3O_4$ | 1317-61-9 |
| 4 | Zirconium(IV) oxide | $ZrO_2$ | 1314-23-4 |
| 5 | Hafnium(IV) oxide | $HfO_2$ | 12055-23-1 |
| 6 | Thorium(IV) oxide | $ThO_2$ | 1314-20-1 |
| 7 | Aluminum oxide | $Al_2O_3$ | 1344-28-1 |
| 8 | Silicon dioxide | $SiO_2$ | 7631-86-9 |
| 9 | Molybdenum(VI) oxide | $MoO_3$ | 1313-27-5 |
| 10 | Zinc oxide | $ZnO$ | 1314-13-2 |
| 11 | Beryllium oxide | $BeO$ | 1304-56-9 |
| 12 | Praseodymium(III) oxide | $Pr_2O_3$ | 12036-32-7 |
| 13 | Silver phosphate | $A_3PO_4$ | 7784-09-0 |
| 14 | Silver molybdate | $Ag_2MoO_4$ | 13765-74-7 |
| 15 | Titanium carbide | $TiC$ | 12070-08-5 |
| 16 | Calcium carbide | $CaC_2$ | 75-20-7 |
| 17 | Silicon carbide | $SiC$ | 409-21-2 |
| 18 | Calcium carbonate | $CaCO_3$ | 471-34-1 |
| 19 | Strontium carbonate | $SrCO_3$ | 1633-05-2 |
| 20 | Titanium dioxide | $TiO_2$ | 13463-67-7 |
| 21 | Silicon | $Si$ | 7440-21-3 |
| 22 | Titanium | $Ti$ | 7440-32-6 |
| 23 | Rhodium | $Rh$ | 7440-16-6 |
| 24 | Aluminium Nitride | $AlN$ | 24304-00-5 |
| 25 | Boronnitride | $BN$ | 10043-11-5 |
| 26 | Phosphoric acid | $H_3PO_4$ | 7664-38-2 |
| 27 | Sulfuric acid | $H_2SO_4$ | 7664-93-9 |
| 28 | Sodium hexametaphosphate | $(NaPO_3)_6$ | 10124-56-8 |
| 29 | Zinc molybdate | $ZnMoO_4$ | 13767-32-3 |
| 30 | Chromium(III) oxide | $Cr_2O_3$ | 1308-38-9 |

The heat transfer material of the invention contains a plurality of the above listed chemicals in amounts that can vary depending upon the specific application of use. The mixture can contain 5-10, or at least 5, 6, 7, 8, 9 or 10 or more of the above chemicals.

Of these compounds, the heat transfer material of the invention comprises at least insoluble fine particles of cobalt (I, III) oxide, iron (II, III) oxide, zirconium (IV) oxide, aluminum oxide and zinc molybdate, and at least one member selected from the group consisting of phosphoric acid and sulfuric acid.

The heat transfer material according to the invention can further comprise at least one member selected from fine particles fine particles of manganese (II, III) oxide, silicon dioxide, zinc oxide, silver phosphate, silver molybdate, titanium carbide, calcium carbonate, strontium carbonate, titanium dioxide, silicon, titanium, aluminum nitride, boronnitride and chromium (III) oxide. Of these, the heat transfer material of the invention can particularly further comprise at least one member selected from the group consisting of fine particles of silicon dioxide, silver phosphate and titanium carbide, or at least one member selected from the group consisting of fine particles of manganese (II, III) oxide, zinc oxide, silver molybdate, calcium carbonate, strontium carbonate, silicon, titanium, and chromium (III) oxide.

The heat transfer material of the invention can contain the particles in a range of amounts, including the following % by weight amounts (calculated based on the total amount of fine particles, prior to mixing with phosphoric acid and/or sulfuric acid):
cobalt (II, III) oxide—0.3-0.6%
iron (II, III) oxide—12.0-18.5%
zirconium (IV) oxide—32.1-49.9%
aluminum oxide—11.7-32.4%
zinc molybdate—3.3-5.8%
silicon dioxide—4.1-9.3%
zinc oxide—0.8-1.2%
silver phosphate—3.2-4.6%
titanium carbide—3.4-4.7%
titanium dioxide—4.0-5.7%
aluminum nitride—11.7-15.9%
boronnitride—2.5-3.4%

The heat transfer material according to the invention can comprise the fine particles in the following % by weight amounts:
cobalt (II, III) oxide—0.32-0.58%
iron (II, III) oxide—12.01-18.49%
zirconium (IV) oxide—32.16-49.90%
aluminum oxide—11.72-32.36%
zinc molybdate—3.35-5.78%
silicon dioxide—4.19-9.25%
zinc oxide—0.83-1.15%
silver phosphate—3.21-4.62%
titanium carbide—3.42-4.62%
titanium dioxide—4.02-5.67%
aluminum nitride—11.72-15.86%
boronnitride—2.52-3.40%

The heat transfer material according to the invention can also comprise the fine particles in the following % by weight amounts:
cobalt (II, III) oxide—0.3-0.6%
iron (II, III) oxide—12.0-18.5%
zirconium (IV) oxide—32.1-49.9%
aluminum oxide—11.7-32.4%
zinc molybdate—3.3-5.8%
silicon dioxide—4.1-9.3%
silver phosphate—3.2-4.6%
titanium carbide—3.4-4.7%
aluminum nitride—11.7-15.9%
boronnitride—2.5-3.4%

The heat transfer material according to the invention can comprise the fine particles in the following % by weight amounts:
cobalt (II, III) oxide—0.32-0.58%
iron (II, III) oxide—12.01-18.49%
zirconium (IV) oxide—32.16-49.90%
aluminum oxide—11.72-32.36%
zinc molybdate—3.35-5.78%
silicon dioxide—4.19-9.25%
silver phosphate—3.21-4.62%
titanium dioxide—4.02-5.67%

The heat transfer material according to the invention can comprise the fine particles in the following % by weight amounts:
cobalt (II, III) oxide—0.32-0.58%
iron (II, III) oxide—12.01-18.49%
zirconium (IV) oxide—32.16-49.90%
aluminum oxide—11.72-32.36%
zinc molybdate—3.35-5.78%
silicon dioxide—4.19-9.25%
titanium dioxide—4.02-5.67%

The heat transfer material according to the invention can comprise the fine particles in the following % by weight amounts:
cobalt (II, III) oxide—0.32-0.58%
iron (I, II) oxide—12.01-18.49%
zirconium (IV) oxide—32.16-49.90%
aluminum oxide—11.72-32.36%
zinc molybdate—3.35-5.78%
silicon dioxide—4.19-9.25%
zinc oxide—0.83-1.15%
silver phosphate—3.21-4.62%

The heat transfer material according to the invention can comprise the fine particles in the following % by weight amounts:
cobalt (II, III) oxide—0.32-0.58%
iron (II, III) oxide—12.01-18.49%
zirconium (IV) oxide—32.16-49.90%
aluminum oxide—11.72-32.36%
zinc molybdate—3.35-5.78%
silicon dioxide—4.19-9.25%
zinc oxide—0.83-1.15%
silver phosphate—3.21-4.62%
titanium dioxide—4.02-5.67%

The heat transfer material according to the invention can comprise the fine particles in the following % by weight amounts:
cobalt (II, III) oxide—0.32-0.58%
iron (II, III) oxide—12.01-18.49%
zirconium (IV) oxide—32.16-49.90%
aluminum oxide—11.72-32.36%
zinc molybdate—3.35-5.78%
silicon dioxide—4.19-9.25%
titanium carbide—3.42-4.62%
titanium dioxide—4.02-5.67%
aluminum nitride—11.72-15.86%
boronnitride—2.52-3.40%

The heat transfer material according to the invention can comprise the fine particles in the following % by weight amounts:

| Chemical Name | Formula | 1 | 2 | 3 | 4 | 5 | 6 | 7 |
|---|---|---|---|---|---|---|---|---|
| Cobalt(II, III) oxide | $Co_3O_4$ | 0.40 | 0.38 | 0.39 | 0.40 | 0.38 | 0.50 | 0.49 |
| Iron(II, III) oxide | $Fe_3O_4$ | 15.0 | 14.18 | 15.7 | 15.94 | 15.14 | 16.0 | 15.76 |
| Zirconium(IV) oxide | $ZrO_2$ | 40.2 | 41.75 | 43.3 | 39.84 | 37.84 | 40.2 | 39.41 |

-continued

| Chemical Name | Formula | 1 | 2 | 3 | 4 | 5 | 6 | 7 |
|---|---|---|---|---|---|---|---|---|
| Aluminum oxide | $Al_2O_3$ | 25.1 | 26.57 | 22.6 | 27.89 | 26.49 | 28.1 | 13.79 |
| Silicon dioxide | $SiO_2$ | 6.04 | 7.59 | 7.89 | 5.98 | 5.68 | 8.04 | 4.93 |
| Zinc oxide | ZnO | | | | 1.00 | 0.95 | | |
| Silver phosphate | $Ag_3PO_4$ | 4.02 | 3.80 | | 3.98 | 3.78 | | |
| Titanium carbide | TiC | 4.02 | | | | | | |
| Titanium dioxide | $TiO_2$ | | | 4.93 | | 4.73 | | 4.93 |
| Aluminium Nitride | AlN | | | | | | | 13.79 |
| Boronnitride | BN | | | | | | | 2.96 |
| Zinc molybdate | $ZnMoO_4$ | 5.03 | 4.74 | 4.93 | 4.98 | 4.73 | 4.02 | 3.94 |

As noted above, in addition to the fine particles, the heat transfer material of the invention further comprises phosphoric acid or said sulfuric acid, which can be contained in an amount of 0.8 to 1.2 weight %, and specifically in an amount of 1.0% by weight, added in an amount sufficient to adjust the mixture to the desired pH of 4.5 to 5.5, or 4.8 to 5.2, or particularly to about 5.0.

The particles that comprise the heat transfer material of the invention can have an average size of less than one micron, such as from 0.1 to 1 micron, or 0.5 to 1 micron. Of those, the particles of iron (II, III), zirconium oxide and aluminum nitride can have an average size of 20 to 400 nanometers, such as from 10 to 400 nanometers, or 0.1 to 1.5 microns.

The heat transfer material of the invention is combined with deionized water to form a heat transfer medium, generally in an amount of about 1 part heat transfer material to 110 parts of deionized water, or generally in the range of 0.5 to 1.5:100.

Procedure for Making the QTG Medium and Filling a Heat Transfer Device

The filling process for QTG Medium is an important step in the preparation of thermal transfer devices. The procedures are as follows:

1. The powder of QTG Medium is suspended in deionized water with a volume fraction of 1%, to form a heat transfer fluid.
2. This heat transfer fluid is filled into the inner cavity of a thermal transfer device, with a filling ratio of 10%.
3. After filling with QTG Medium, the device is heated to 115° C. to start the degassing procedure. The degassing procedure is repeated a few times before allowing the temperature to rise isothermally to 125° C. Upon reaching 125° C., the last degassing is performed and the device is sealed.
4. Degassing while heating is a mature technology and industrial standard are known and used in the manufacture of thermal transfer devices. Consumers may modify the filling process of QTG Medium according to specific shapes and structures of devices.
5. The main purpose of degassing while heating is to ensure that the QTG Medium remains as a multiphase form of solid, liquid and gas.

A heat transfer system according to the invention generally comprises a closed container and a cavity within the container, the cavity being at a subatmospheric pressure; and a heat transfer material according to the invention being located within the cavity.

The method for transferring heat according to the invention comprises exposing a heat transfer material according to the invention in a container to energy, to thereby transfer heat energy to the outside of said container.

Methodology for the Heat Transfer of QTG Medium

The heat pipe test is the most effective method to examine the thermal performance. The heat transfer and thermal resistance can be calculated when the heat pipe is at the steady state. Detailed calculation using water cooling system as an example is presented below:

1. Heat Transfer Calculation

The heat transfer of heat pipe can be represented by the thermal energy absorbed by the cooling water:

$$Q = Q_1 - Q_2$$

$$Q = G \times c_p (T_{out} - T_{in})$$

Where,
$Q_1$ is the heat input, in W
$Q_2$ is the heat loss, in W, and negligible with good thermal insulation
G is the mass flow rate of cooling water, in kg/s
$c_p$ is the heat capacity of cooling water, in kJ/kg
$T_{out}$ is the outlet temperature of cooling water, in ° C.
$T_{in}$ is the inlet temperature of cooling water, in ° C.

2. Thermal Resistance Calculation

Total thermal resistance of heat pipe can be calculated as:

$$R_t = \frac{T_{we} - T_{wc}}{Q}$$

Where,
$R_t$ is the total thermal resistance, in ° C./W
$T_{we}$ is the mean value of temperatures at the evaporation sector, in ° C.
$T_{wc}$ is the mean value of temperatures at the condensation sector, in ° C.

EXAMPLES

Example 1

| Chemical Name | Chemical | CAS Number | Quantity (g) |
|---|---|---|---|
| Zinc molybdate | $ZnMoO_4$ | 13767-32-3 | 0.05 |
| Aluminum oxide | $Al_2O_3$ | 1344-28-1 | 0.25 |
| Zirconium(IV) oxide | $ZrO_2$ | 1314-23-4 | 0.4 |
| Iron(II, III) oxide | $Fe_3O_4$ | 1317-61-9 | 0.15 |
| Silver phosphate | $Ag_3PO_4$ | 7784-09-0 | 0.04 |
| Silicon dioxide | $SiO_2$ | 7631-86-9 | 0.06 |
| Cobalt(II, III) oxide | $Co_3O_4$ | 1308-06-1 | 0.004 |
| Titanium carbide | TiC | 12070-08-5 | 0.04 |
| Phosphoric acid | $H_3PO_4$ | 7664-38-2 | 0.01 |
| Number of Compound | 9 | Total Weight (g) | 1.004 |

Example 2

| Chemical Name | Chemical | CAS Number | Quantity (g) |
|---|---|---|---|
| Zinc molybdate | $ZnMoO_4$ | 13767-32-3 | 0.05 |
| Aluminum oxide | $Al_2O_3$ | 1344-28-1 | 0.28 |
| Silver phosphate | $Ag_3PO_4$ | 7784-09-0 | 0.04 |
| Zirconium(IV) oxide | $ZrO_2$ | 1314-23-4 | 0.44 |
| Iron(II, III) xide | $Fe_3O_4$ | 1317-61-9 | 0.16 |
| Silicon dioxide | $SiO_2$ | 7631-86-9 | 0.0 |
| Cobalt(II, III) oxide | $Co_3O_4$ | 1308-06-1 | 0.004 |
| Sulfuric acid | $H_2SO_4$ | 7664-93-9 | 0.01 |
| Number of Compound | 8 | Total Weight (g) | 1.064 |

Example 3

| Chemical Name | Chemical | CAS Number | Quantity (g) |
|---|---|---|---|
| Zinc molybdate | $ZnMoO_4$ | 13767-32-3 | 0.05 |
| Aluminum oxide | $Al_2O_3$ | 1344-28-1 | 0.23 |
| Zirconium(IV) oxide | $ZrO_2$ | 1314-23-4 | 0.44 |
| Iron(II, III) oxide | $Fe_3O_4$ | 1317-61-9 | 0.16 |
| Silicon dioxide | $SiO_2$ | 7631-86-9 | 0.08 |
| Titanium dioxide | $TiO_2$ | 13463-67-7 | 0.05 |
| Cobalt(II, III) oxide | $Co_3O_4$ | 1308-06-1 | 0.004 |
| Phosphoric acid | $H_3PO_4$ | 7664-38-2 | 0.01 |
| Number of Compound | 8 | Total Weight (g) | 1.024 |

Example 4

| Chemical Name | Chemical | CAS Number | Quantity (g) |
|---|---|---|---|
| Zinc molybdate | $ZnMoO_4$ | 13767-32-3 | 0.05 |
| Zinc oxide | $ZnO$ | 1314-13-2 | 0.01 |
| Aluminum oxide | $Al_2O_3$ | 1344-28-1 | 0.28 |
| Zirconium(IV) oxide | $ZrO_2$ | 1314-23-4 | 0.4 |
| Iron(II, III) oxide | $Fe_3O_4$ | 1317-61-9 | 0.16 |
| Silver phosphate | $Ag_3PO_4$ | 7784-09-0 | 0.04 |
| Silicon dioxide | $SiO_2$ | 7631-86-9 | 0.06 |
| Cobalt(II, III) oxide | $Co_3O_4$ | 1308-06-1 | 0.004 |
| Sulfuric acid | $H_2SO_4$ | 7664-93-9 | 0.01 |
| Number of Compound | 9 | Total Weight (g) | 1.014 |

Example 5

| Chemical Name | Chemical | CAS Number | Quantity (g) |
|---|---|---|---|
| Zinc molybdate | $ZnMoO_4$ | 13767-32-3 | 0.05 |
| Zinc oxide | $ZnO$ | 1314-13-2 | 0.01 |
| Titanium dioxide | $TiO_2$ | 13463-67-7 | 0.05 |
| Aluminum oxide | $Al_2O_3$ | 1344-28-1 | 0.28 |
| Zirconium(IV) oxide | $ZrO_2$ | 1314-23-4 | 0.4 |
| Iron(II, III) oxide | $Fe_3O_4$ | 1317-61-9 | 0.16 |
| Silver phosphate | $Ag_3PO_4$ | 7784-09-0 | 0.04 |
| Silicon dioxide | $SiO_2$ | 7631-86-9 | 0.06 |
| Cobalt(II, III) oxide | $Co_3O_4$ | 1308-06-1 | 0.004 |
| Phosphoric acid | $H_3PO_4$ | 7664-38-2 | 0.01 |
| Number of Compound | 10 | Total Weight (g) | 1.067 |

Example 6

| Chemical Name | Chemical | CAS Number | Quantity (g) |
|---|---|---|---|
| Zinc molybdate | $ZnMoO_4$ | 13767-32-3 | 0.04 |
| Aluminum oxide | $Al_2O_3$ | 1344-28-1 | 0.28 |
| Zirconium(IV) oxide | $ZrO_2$ | 1314-23-4 | 0.4 |
| Iron(II, III) oxide | $Fe_3O_4$ | 1317-61-9 | 0.16 |
| Silicon dioxide | $SiO_2$ | 7631-86-9 | 0.08 |
| Cobalt(II, III) oxide | $Co_3O_4$ | 1308-06-1 | 0.005 |
| Sulfuric acid | $H_2SO_4$ | 7664-93-9 | 0.01 |
| Number of Compound | 7 | Total Weight (g) | 1.005 |

Example 7

| Chemical Name | Chemical | CAS Number | Quantity (g) |
|---|---|---|---|
| Zinc molybdate | $ZnMoO_4$ | 13767-32-3 | 0.04 |
| Aluminum oxide | $Al_2O_3$ | 1344-28-1 | 0.14 |
| Aluminium Nitride | AlN | 24304-00-5 | 0.14 |
| Zirconium(IV) oxide | $ZrO_2$ | 1314-23-4 | 0.4 |
| Iron(II, III) oxide | $Fe_3O_4$ | 1317-61-9 | 0.16 |
| Silicon dioxide | $SiO_2$ | 7631-86-9 | 0.05 |
| Titanium dioxide | $TiO_2$ | 13463-67-7 | 0.05 |
| Boronnitride | BN | 10043-11-5 | 0.03 |
| Cobalt(II, III) oxide | $Co_3O_4$ | 1308-06-1 | 0.005 |
| Phosphoric acid | $H_3PO_4$ | 7664-38-2 | 0.01 |
| Number of Compound | 10 | Total Weight (g) | 1.025 |

Example 8

| Chemical Name | Chemical | CAS Number | Quantity (g) |
|---|---|---|---|
| Zinc molybdate | $ZnMoO_4$ | 13767-32-3 | 0.04 |
| Aluminum oxide | $Al_2O_3$ | 1344-28-1 | 0.2 |
| Zirconium(IV) oxide | $ZrO_2$ | 1314-23-4 | 0.4 |
| Iron(II, III) oxide | $Fe_3O_4$ | 1317-61-9 | 0.16 |
| Silver phosphate | $Ag_3PO_4$ | 7784-09-0 | 0.35 |
| Silicon dioxide | $SiO_2$ | 7631-86-9 | 0.5 |
| Cobalt(II, III) oxide | $Co_3O_4$ | 1308-06-1 | 0.004 |
| Titanium carbide | TiC | 12070-08-5 | 0.035 |
| Phosphoric acid | $H_3PO_4$ | 7664-38-2 | 0.01 |
| Number of Compound | 9 | Total Weight (g) | 1.699 |

Example 9

| Chemical Name | Chemical | CAS Number | Quantity (g) |
|---|---|---|---|
| Silver molybdate | $Ag_2MoO_4$ | 13767-74-7 | 0.05 |
| Thorium (IV) oxide | $ThO_2$ | 1314-20-1 | 0.2 |
| Silver phosphate | $Ag_3PO_4$ | 7784-09-0 | 0.04 |
| Zirconium(IV) oxide | $ZrO_2$ | 1314-23-4 | 0.44 |
| Iron(II, III) oxide | $Fe_3O_4$ | 1317-61-9 | 0.16 |
| Silicon dioxide | $SiO_2$ | 7631-86-9 | 0.08 |
| Cobalt(II, III) oxide | $Co_3O_4$ | 1308-06-1 | 0.004 |
| Sulfuric acid | $H_2SO_4$ | 7664-93-9 | 0.01 |
| Number of Compound | 8 | Total Weight (g) | 1.064 |

Example 10

| Chemical Name | Chemical | CAS Number | Quantity (g) |
| --- | --- | --- | --- |
| Zinc molybdate | $ZnMoO_4$ | 13767-32-3 | 0.05 |
| Aluminum oxide | $Al_2O_3$ | 1344-28-1 | 0.23 |
| Hafnium(IV) oxide | $HfO_2$ | 12055-23-1 | 0.44 |
| Iron(II, III) oxide | $Fe_3O_4$ | 1317-61-9 | 0.16 |
| Silicon dioxide | $SiO_2$ | 7631-86-9 | 0.08 |
| Titanium dioxide | $TiO_2$ | 13463-67-7 | 0.05 |
| Cobalt(II, III) oxide | $Co_3O_4$ | 1308-06-1 | 0.004 |
| Sulfuric acid | $H_2SO_4$ | 7664-93-9 | 0.01 |
| Number of Compound | 8 | Total Weight (g) | 1.024 |

Example 11

| Chemical Name | Chemical | CAS Number | Quantity (g) |
| --- | --- | --- | --- |
| Zinc molybdate | $ZnMoO_4$ | 13767-32-3 | 0.05 |
| Zinc oxide | $ZnO$ | 1314-13-2 | 0.01 |
| Aluminum oxide | $Al_2O_3$ | 1344-28-1 | 0.28 |
| Zirconium(IV) oxide | $ZrO_2$ | 1314-23-4 | 0.42 |
| Iron(II, III) oxide | $Fe_3O_4$ | 1317-61-9 | 0.16 |
| Silver phosphate | $Ag_3PO_4$ | 7784-09-0 | 0.04 |
| Titanium dioxide | $TiO_2$ | 13463-38-2 | 0.08 |
| Cobalt(II, III) oxide | $Co_3O_4$ | 1308-06-1 | 0.004 |
| Phosphoric acid | $H_3PO_4$ | 7664-38-2 | 0.01 |
| Number of Compound | 9 | Total Weight (g) | 1.054 |

Example 12

| Chemical Name | Chemical | CAS Number | Quantity (g) |
| --- | --- | --- | --- |
| Zinc molybdate | $ZnMoO_4$ | 13767-32-3 | 0.05 |
| Beryllium oxide | $BeO$ | 1304-56-9 | 0.01 |
| Titanium dioxide | $TiO_2$ | 13463-67-7 | 0.05 |
| Aluminum oxide | $Al_2O_3$ | 1344-28-1 | 0.28 |
| Zirconium(IV) oxide | $ZrO_2$ | 1314-23-4 | 0.4 |
| Iron(II, III) oxide | $Fe_3O_4$ | 1317-61-9 | 0.16 |
| Silver phosphate | $Ag_3PO_4$ | 7784-09-0 | 0.04 |
| Silicon | $Si$ | 7440-21-3 | 0.06 |
| Cobalt(II, III) oxide | $Co_3O_4$ | 1308-06-1 | 0.004 |
| Sulfuric acid | $H_2SO_4$ | 7664-93-9 | 0.01 |
| Number of Compound | 10 | Total Weight (g) | 1.064 |

Example 13

| Chemical Name | Chemical | CAS Number | Quantity (g) |
| --- | --- | --- | --- |
| Zinc molybdate | $ZnMoO_4$ | 13767-32-3 | 0.05 |
| Aluminum oxide | $Al_2O_3$ | 1344-28-1 | 0.14 |
| Zirconium(IV) oxide | $ZrO_2$ | 1314-23-4 | 0.44 |
| Iron(II, III) oxide | $Fe_3O_4$ | 1317-61-9 | 0.15 |
| Silicon dioxide | $SiO_2$ | 7631-86-9 | 0.06 |
| Cobalt(II, III) oxide | $Co_3O_4$ | 1308-06-1 | 0.004 |
| Sulfuric acid | $H_2SO_4$ | 7664-93-9 | 0.01 |
| Number of Compound | 7 | Total Weight (g) | .854 |

Example 14

| Chemical Name | Chemical | CAS Number | Quantity (g) |
| --- | --- | --- | --- |
| Zinc molybdate | $ZnMoO_4$ | 13767-32-3 | 0.05 |
| Aluminum oxide | $Al_2O_3$ | 1344-28-1 | 0.23 |
| Aluminium Nitride | $AlN$ | 24304-00-5 | 0.14 |
| Zirconium(IV) oxide | $ZrO_2$ | 1314-23-4 | 0.4 |
| Iron(II, III) oxide | $Fe_3O_4$ | 1317-61-9 | 0.1 |
| Silicon dioxide | $SiO_2$ | 7631-86-9 | 0.07 |
| Titanium dioxide | $TiO_2$ | 13463-67-7 | 0.05 |
| Boronnitride | $BN$ | 10043-11-5 | 0.03 |
| Cobalt(II, III) oxide | $Co_3O_4$ | 1308-06-1 | 0.004 |
| Phosphoric acid | $H_3PO_4$ | 7664-38-2 | 0.01 |
| Number of Compound | 10 | Total Weight (g) | 1.144 |

Evaluation of Heat Transfer Mediums According to the Invention

A heat transfer performance test of a heat pipe is the most direct and effective method to demonstrate the unique heat transfer properties of a medium according to the invention. Materials and Method:

To test the heat medium of the invention, a heat pipe (a Quantum Tube) is filled with 5-10% of the heat transfer medium of the invention (volume fraction of the internal cavity of the heat pipe). FIG. 1 is a schematic representation of a Quantum Tube 1 according to the present invention; which is a heat pipe 1 filled to about 10% of the tube cavity volume with QTG Medium that has been heated to 125° C. for degassing and subsequently sealed. During the filling, heating and degassing process, some particles of QTG Medium are coated or adsorbed onto the inner wall, while others are suspended in the cavity of the tube or dispersed in the fluid, forming a multiphase state.

Five thermocouples, T1-T5, are positioned along the Quantum Tube. Thermocouple T5 is placed in the center of cartridge heater 3 to measure its temperature.

When the room temperature is 22° C., the cartridge heater 3 within the Quantum Tube is turned on to initiate heating. Temperature probes 10 connect temperature meters 4 at each thermocouple to measure the rise in temperature, and show an instantaneously or simultaneously rise to exhibit isothermal heat transfer. The temperatures at the meters 4 at T1-T4 rise simultaneously, almost instantaneously, and all continue rise in a homogenous temperature condition.

The heat transfer medium of the invention is evaluated by a test to measure the heat transfer characteristics.

Example 1

Isothermal Heat Transfer Axially and Radially

As noted above, FIG. 1 depicts the Quantum Tube 1 filled with the QTG medium for testing, and FIG. 2 is a schematic presentation of the testing system showing the power source 11, thermocouple heating system 12, computer data system 13 and circulating water system 14.

The heat pipe filled with QTG medium in an amount of about 10% of the pipe cavity volume is able to exhibit isothermal heat transfer simultaneously. This is not possible with a heat pipe filled with deionized water, even if filled up to 85% of the pipe cavity volume.

Figure 3:
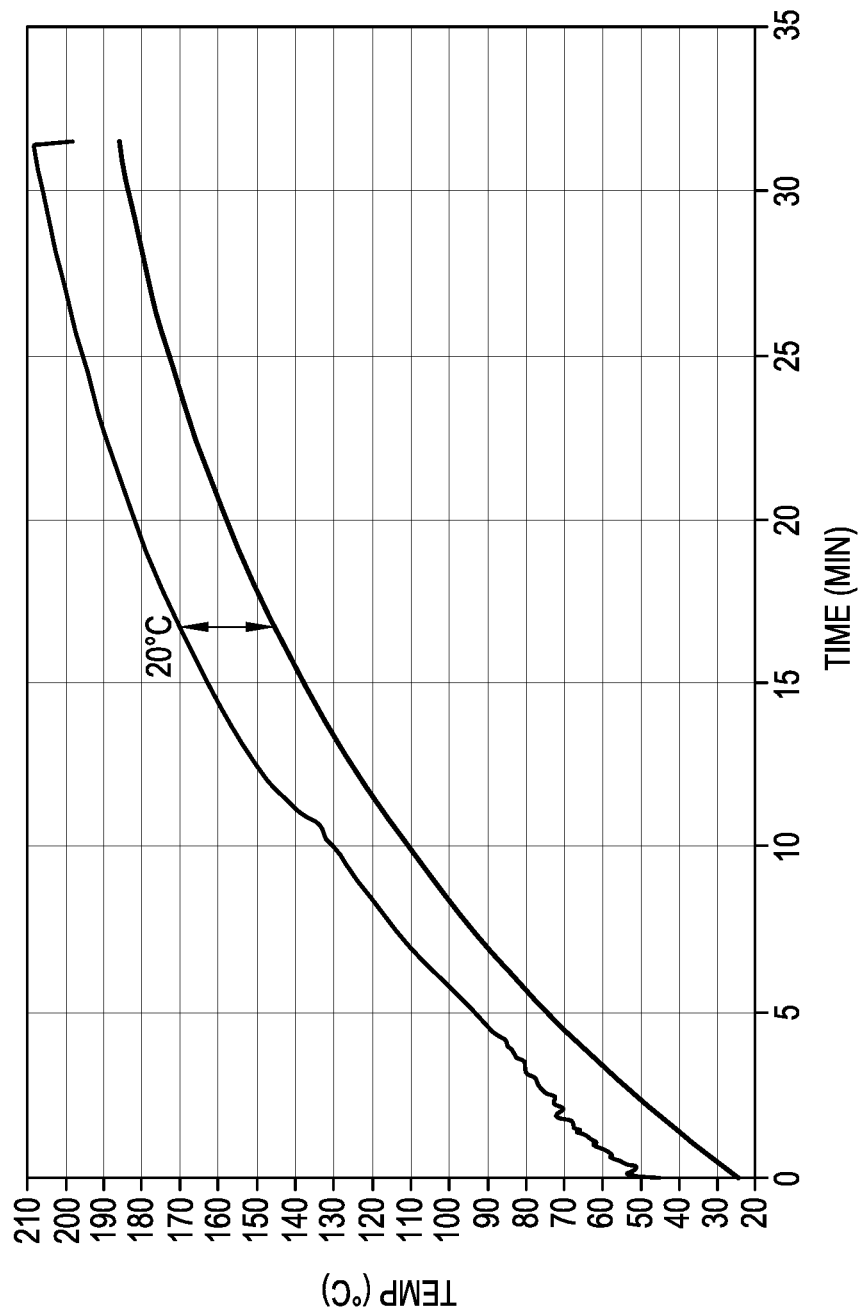
FIG. 3 presents the heat transfer performance of QTG Medium in Quantum Tube, which demonstrates the isothermal heat transfer.

FIG. 3 presents the results of the heat transfer performance of QTG Medium in Quantum Tube, which demonstrates the isothermal heat transfer axially and radially.

Example 2

Cooling with a Negative Temperature Gradient

The testing tube and thermocouples are set up as described above in Example 1. The testing tube is heated to above 140° C. A cool towel soaked in ice water is wrapped around the end of the pipe nearer to T6, with ice water running down the towel to maintain the cool temperature of the towel. The temperature of the pipe at all portions (as measured at T1-T6) begins to drop, and the temperature at T1 quickly even shows a temperature below any of T2-T6, which are closer to the cool towel. Also, when the cool wet towel is wrapped around the pipe between T1 and T2, or T2 and T3, or T3 and T4, or T4 and T5, or T5 and T6, all of temperatures drop, and T6 is higher than T5-T1, and the heating cartridge temperature.

Figure 4:
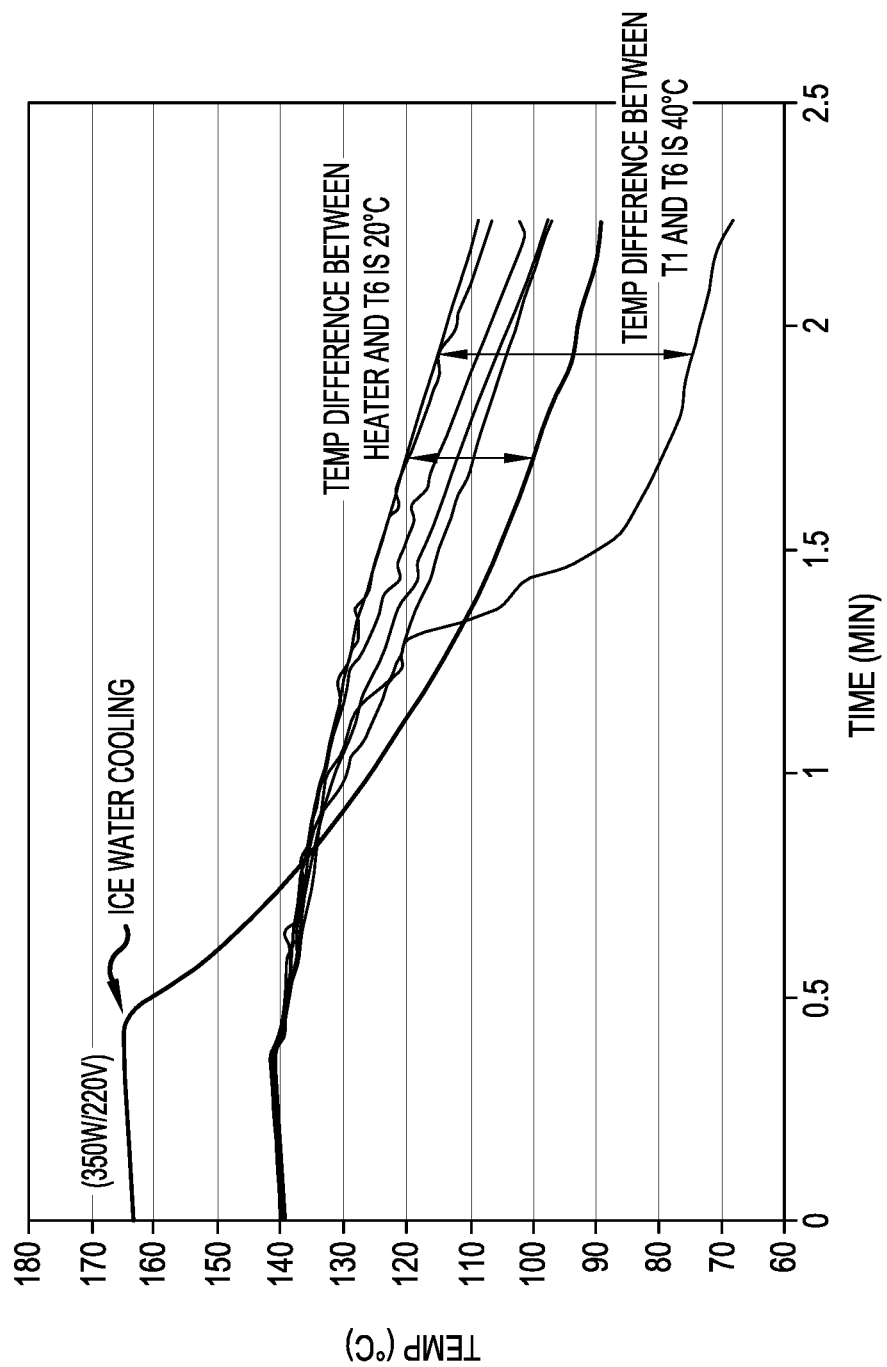
FIG. 4 is a graph that demonstrates the cooling with a negative temperature gradient.
Figure 5A:
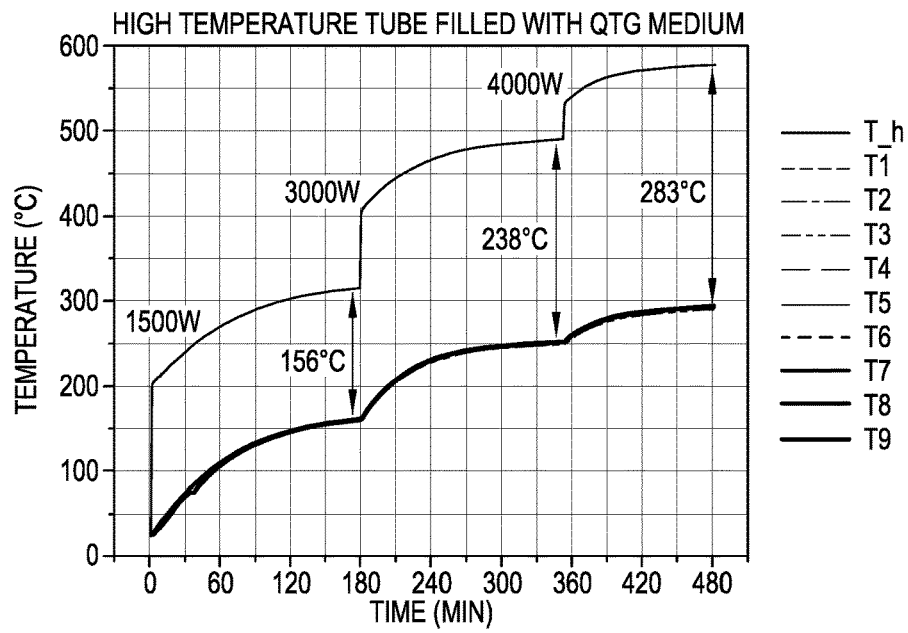
FIGS. 5A-5D presents a comparison of heat transfer performance between high temperature tubes filled with QTG Medium and deionized (DI) water.
Figure 5B:
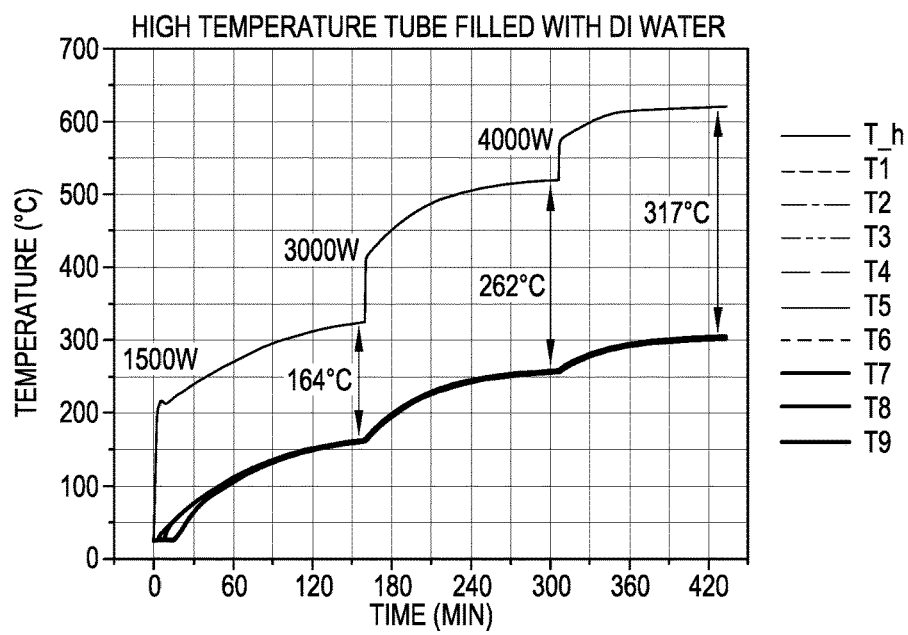
Figure 5C:
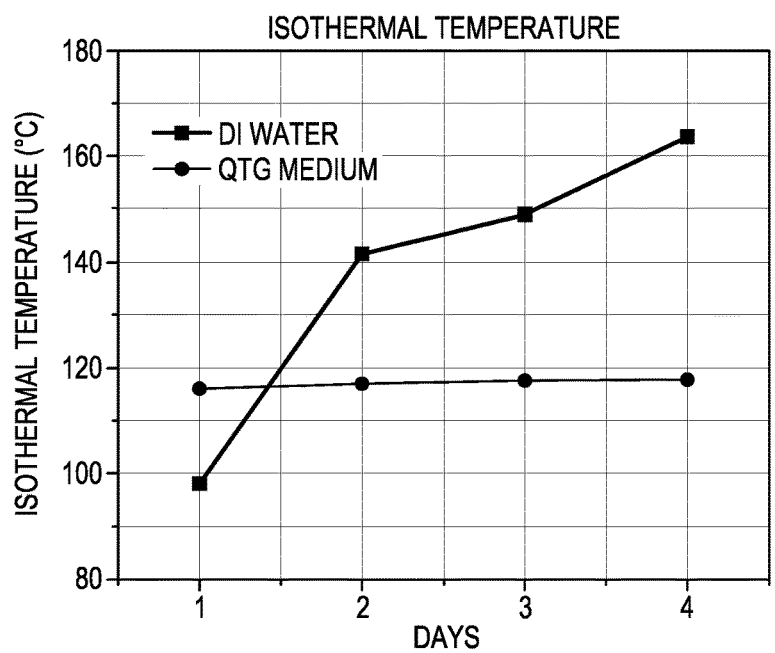
Figure 5D:
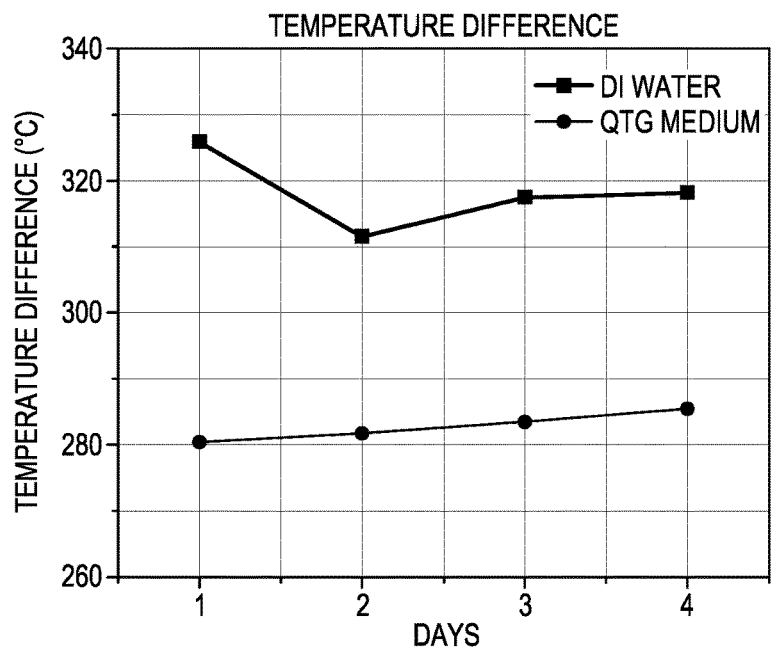

FIG. 4 presents the results of the measurements to show the cooling with a negative temperature gradient.

Heat Transfer of QTG Medium in High Temperature Tube

FIG. 5 presents the comparison of heat transfer performance between high temperature tubes filled with QTG Medium and deionized (DI) water. FIG. 5(a) shows a typical temperature increase during the heating process for the high temperature tube filled with QTG medium, where T_h is the temperature of the cartridge heater, and T1-T9 are surface temperatures along the high temperature tube. With the power input of 1500 W applied, the tube surface temperatures rise instantaneously, and soon the tube surface is isothermal. With the power input increases, the tube surface temperatures rise isothermally and finally reach to around 300° C., with a temperature difference of 283° C. between the cartridge heater temperature and the tube surface temperature. A typical heat transfer performance of the high temperature tube filled with DI water is presented in FIG. 5(b) as a comparison. A stability investigation is performed in FIGS. 5(c) and (d). The isothermal temperature of DI water tube has deteriorated with days of operation, while that of QTG Medium tube remains stable, as shown in FIG. 5(c). The temperature difference for the QTG Medium tube at high temperature range is around 283° C., whereas that for the DI water tube is around 317° C., as shown in FIG. 5(d)

Heat Transfer of QTG Medium in Thermal Transfer Components with Various Shapes

Figure 6:
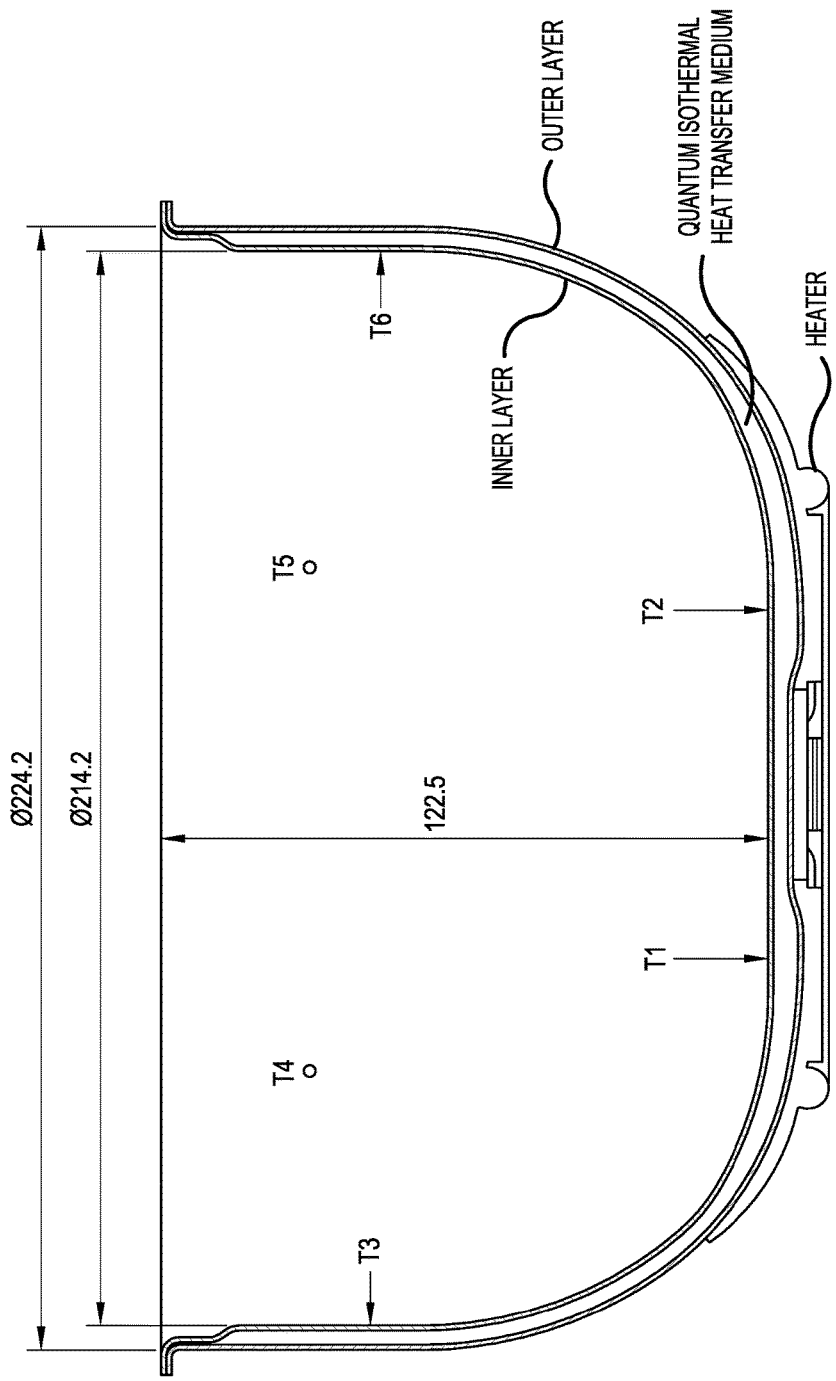
FIG. 6 is a schematic representation of Quantum Pot according to the present invention.

FIG. 6 is a schematic representation of a Quantum Pot according to the present invention. It is an odd-shaped thermal transfer component filled with QTG Medium that has been heated to 125° C. for degassing and subsequently sealed. During the filling, heating and degassing process, some particles of QTG Medium are coated or adsorbed onto the inner wall, while others are suspended in the cavity of the pot or dispersed in the fluid, forming a multiphase state. When the room temperature is 22° C., upon switching on the electric heating plate, T1-T6 instantaneously or simultaneously rise to exhibit isothermal heat transfer. This is known as Isothermal Heat Transfer of QTG Medium in Thermal Transfer Components of Various Shapes.

Electric Potential Test of QTG Medium During the Heat Transfer Process

Figure 7:
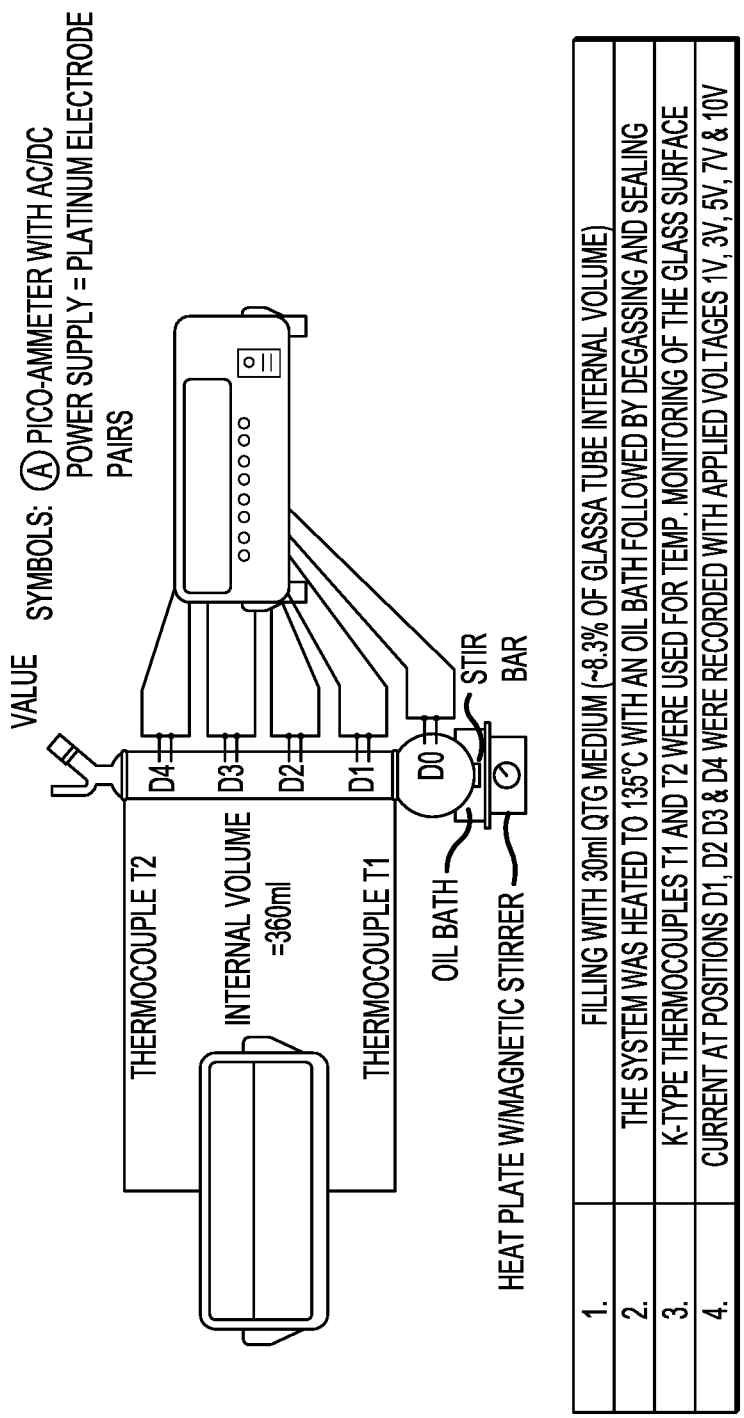
FIG. 7 is a schematic representation of electric potential test of QTG Medium.

FIG. 7 is a schematic representation of electric potential test of QTG Medium.

Figure 8:
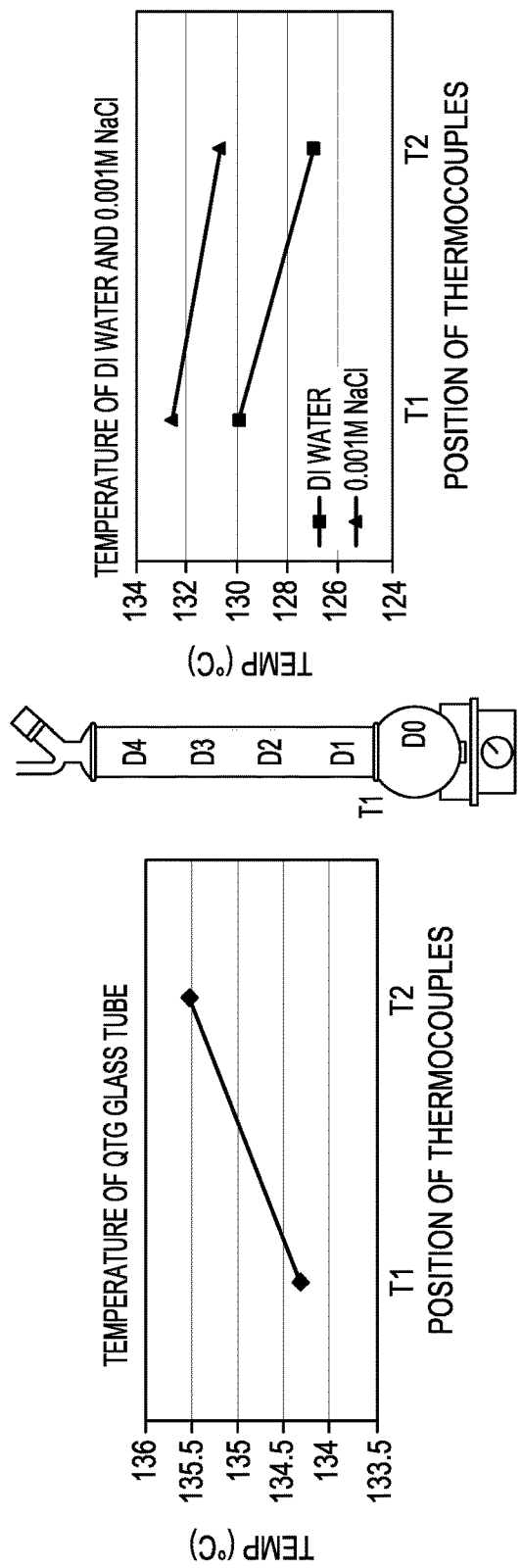
FIG. 8 presents the comparison of temperatures between QTG Medium and deionized (DI) water/NaCl solution.
Figure 9B:
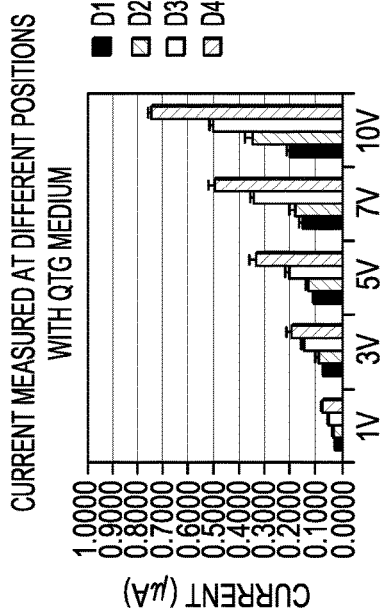
FIGS. 9A-9D presents graphs to show the comparison of electric potentials between QTG Medium and DI water/NaCl solution.
Figure 9D:
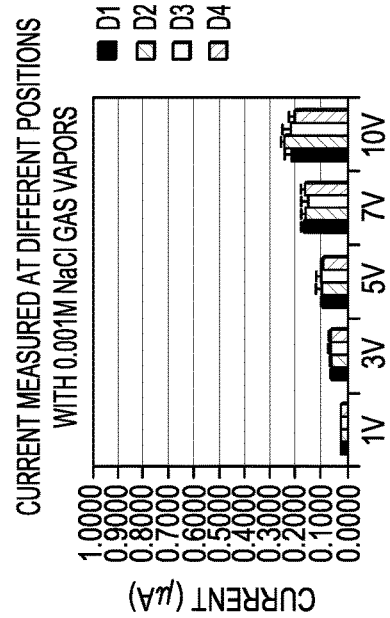
Figure 9A:
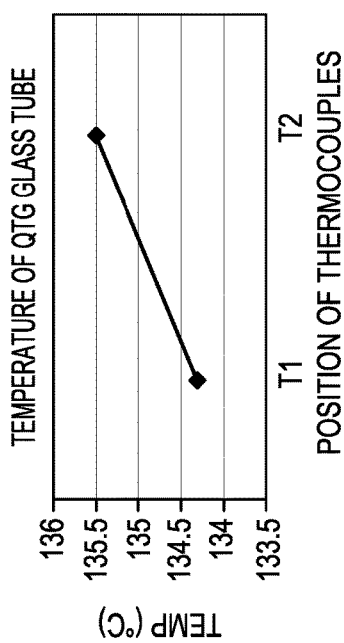
Figure 9C:
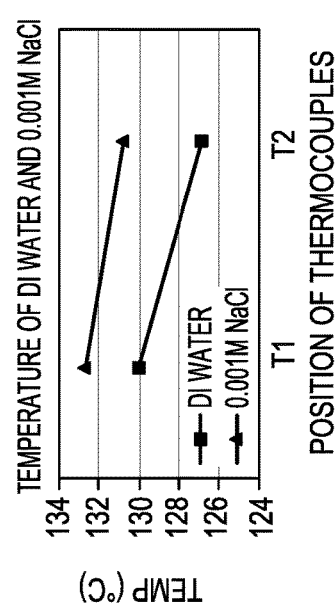

FIG. 8 presents the comparison of temperatures between QTG Medium and deionized water (DI)/NaCl solution. T2 is higher than T1 for QTG Medium, while T2 is lower than T1 for both DI water and 0.001M NaCl solution.

FIG. 9 presents the comparison of electric potentials between QTG Medium and DI water/NaCl solution. QTG Medium shows differences in current at various positions along the glass tube, where the top part shows a high value of current. An increase in voltage would result a more obvious change in the differences of current. 0.001M NaCl gas vapor does not show such current differences.

Evaluation of Static Thermal Conductivity and Resistance

Thermal conductivity characteristics of the medium according to the invention can be measured by the method according to ASTM E1530-11—Standard Test Method for Evaluating the Resistance to Thermal Transmission of Materials by the Guarded Heat Flow Meter Technique. When evaluated by this test method, the product of the invention will show (a) a static thermal conductivity of 1.12 to 1.14, or specifically 1.13, W/m·K, which is about double of that of DI water (0.598 W/m·K) and (b) a thermal resistance of 7.46 to 7.56, or about 7.53E-3 $m^2$K/W.

Evaluation of Surface Tension

Surface tension characteristics of the medium according to the invention can be measured using a FTA 188 Video Contact Angle Analyzer by dispensing a liquid sample onto a based surface, i.e. the Pendant Drop method.

When evaluated according to this method, calibrating the machine using DI water surface tension of 72.80 mN/M (72.80 dyn/cm), the product of the invention shows surface tension values of about 72.88 to 73.27, or typically about 73.08 dyn/cm (mNm).

The invention claimed is:

1. A heat transfer material comprising insoluble fine particles cobalt (II, III) oxide, iron (II, III) oxide, zirconium (IV) oxide, aluminum oxide, silicon dioxide and zinc molybdate.

2. The heat transfer material according to claim 1, further comprising at least one member selected from the group consisting fine particles of zinc oxide, silver phosphate, titanium carbide, titanium dioxide, aluminum nitride and boronnitride.

3. The heat transfer material according to claim 1, further comprising at least one member selected from the group consisting of fine particles of silicon dioxide, silver phosphate and titanium carbide.

4. The heat transfer material according to claim 1, comprising said fine particles in the following % by weight amounts:
cobalt (II, III) oxide—0.3-0.6%
iron (II, III) oxide—12.0-18.5%
zirconium (IV) oxide—32.1-49.9%
aluminum oxide—11.7-32.4%
zinc molybdate—33-5.8%
silicon dioxide—4.1-9.3%.

5. The heat transfer material according to claim 3, comprising said fine particles, where present, in the following % by weight amounts:
cobalt (II, III) oxide—0.3-0.6%
iron (II, III) oxide—12.0-18.5%
zirconium (IV) oxide—32.1-49.9%
aluminum oxide—11.7-32.4%
zinc molybdate—3.3-5.8%
silicon dioxide—4.1-9.3%
zinc oxide—0.8-1.2%
silver phosphate—3.2-4.6%
titanium carbide—3.4-4.7%
titanium dioxide—4.0-5.7%
aluminum nitride—11.7-15.9%
boronnitride—2.5-3.4%.

6. The heat transfer material according to claim 3, comprising said fine particles, where present, in the following % by weight amounts:

cobalt (II, III) oxide—0.32-0.58%
iron (II, III) oxide—12.01-18.49%
zirconium (IV) oxide—32.16-49.90%
aluminum oxide—11.72-32.36%
zinc molybdate—3.35-5.78%
silicon dioxide—4.19-9.25%
zinc oxide—0.83-1.15%
silver phosphate—3.21-4.62%
titanium carbide—3.42-4.62%
titanium dioxide—4.02-5.67%
aluminum nitride—11.72-15.86%
boronnitride—2.52-3.40%.

7. The heat transfer material according to claim 3, comprising said fine particles, where present, in the following % by weight amounts:
cobalt (II, III) oxide—0.3-0.6%
iron (II, III) oxide—12.0-18.5%
zirconium (IV) oxide—32.1-49.9%
aluminum oxide—11.7-32.4%
zinc molybdate—3.3-5.8%
silicon dioxide—4.1-9.3%
silver phosphate—3.2-4.6%
titanium carbide—3.4-4.7%
aluminum nitride—11.7-15.9%
boronnitride—2.5-3.4%.

8. The heat transfer material according to claim 3, comprising said fine particles, where present, in the following % by weight amounts:
cobalt (II, III) oxide—0.32-0.58%
iron (II, III) oxide—12.01-18.49%
zirconium (IV) oxide—32.16-49.90%
aluminum oxide—11.72-32.36%
zinc molybdate—3.35-5.78%
silicon dioxide—4.19-9.25%
silver phosphate—3.21-4.62%
titanium dioxide—4.02-5.67%.

9. The heat transfer material according to claim 3, comprising said fine particles, where present, in the following % by weight amounts:
cobalt (II, III) oxide—0.32-0.58%
iron (II, III) oxide—12.01-18.49%
zirconium (IV) oxide—32.16-49.90%
aluminum oxide—11.72-32.36%
zinc molybdate—3.35-5.78%
silicon dioxide—4.19-9.25%
titanium dioxide—4.02-5.67%.

10. The heat transfer material according to claim 3, comprising said fine particles, where present, in the following % by weight amounts:
cobalt (II, III) oxide—0.32-0.58%
iron (II, III) oxide—12.01-18.49%
zirconium (IV) oxide—32.16-49.90%
aluminum oxide—11.72-32.36%
zinc molybdate—3.35-5.78%
silicon dioxide—4.19-9.25%
zinc oxide—0.83-1.15%
silver phosphate—3.21-4.62%.

11. The heat transfer material according to claim 3, comprising said fine particles, where present, in the following % by weight amounts:
cobalt (II, III) oxide—0.32-0.58%
iron (II, III) oxide—12.01-18.49%
zirconium (IV) oxide—32.16-49.90%
aluminum oxide—11.72-32.36%
zinc molybdate—3.35-5.78%
silicon dioxide—4.19-9.25%
zinc oxide—0.83-1.15%
silver phosphate—3.21-4.62%
titanium dioxide—4.02-5.67%.

12. The heat transfer material according to claim 3, comprising said fine particles, where present, in the following % by weight amounts:
cobalt (II, III) oxide—0.32-0.58%
iron (II, III) oxide—12.01-18.49%
zirconium (IV) oxide—32.16-49.90%
aluminum oxide—11.72-32.36%
zinc molybdate—3.35-5.78%
silicon dioxide—4.19-9.25%
titanium carbide—3.42-4.62%
titanium dioxide—4.02-5.67%
aluminum nitride—11.72-15.86%
boronnitride—2.52-3.40%.

13. The heat transfer material according to claim 1, further comprising at least one member selected from the group consisting of phosphoric acid and sulfuric acid.

14. The heat transfer material according to claim 1, further comprising at least one member selected from the group consisting of phosphoric acid and said sulfuric acid in an amount of 0.8 to 1.2 weight %.

15. The heat transfer material according to claim 1, further comprising at least one member selected from the group consisting of phosphoric acid and said sulfuric acid in an amount sufficient to adjust the pH of said heat transfer material to 4.5 to 5.5.

16. The heat transfer material according to claim 1, wherein said fine particles have an average size of less than one micron.

17. The heat transfer material according to claim 16, wherein said fine particles of Iron (II, III), zirconium oxide and aluminum nitride have an average size of 10 to 400 nanometers.

18. A heat transfer material medium comprising a heat transfer material according to claim 1, and further comprising deionized water.

19. A heat transfer system comprising:
a closed container,
a cavity within the container, the cavity being at a subatmospheric pressure; and
a heat transfer medium according to claim 12 located within the cavity.

20. A method for transferring heat which comprises exposing a heat transfer medium according to claim 18 in a container to energy, to thereby transfer heat energy to the outside of said container.

* * * * *

UNITED STATES PATENT AND TRADEMARK OFFICE
CERTIFICATE OF CORRECTION

PATENT NO. : 10,030,186 B2
APPLICATION NO. : 15/684536
DATED : July 24, 2018
INVENTOR(S) : Ki Chan Page 1 of 1

It is certified that error appears in the above-identified patent and that said Letters Patent is hereby corrected as shown below:

In the Claims

In Claim 4, at Column 16, Line 48, please change:
"zinc molybdate 33-5.8%" to -- zinc molybdate 3.3-5.8% --

Signed and Sealed this
Twenty-fifth Day of September, 2018

Andrei Iancu
*Director of the United States Patent and Trademark Office*